(12) United States Patent
Mallon et al.

(10) Patent No.: US 11,409,848 B2
(45) Date of Patent: Aug. 9, 2022

(54) COMPILER DEVICE WITH MASKING FUNCTION

(71) Applicant: KONINKLIJKE PHILIPS N.V., Eindhoven (NL)

(72) Inventors: Willem Charles Mallon, Eindhoven (NL); Alan Pestrin, Salzburg (AT); Oscar Garcia-Morchon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 31 days.

(21) Appl. No.: 17/257,875

(22) PCT Filed: Jul. 5, 2019

(86) PCT No.: PCT/EP2019/068129
§ 371 (c)(1),
(2) Date: Jan. 5, 2021

(87) PCT Pub. No.: WO2020/008045
PCT Pub. Date: Jan. 9, 2020

(65) Prior Publication Data
US 2021/0326413 A1    Oct. 21, 2021

(30) Foreign Application Priority Data
Jul. 6, 2018   (EP) ..................... 18182155

(51) Int. Cl.
*G06F 21/14*   (2013.01)
*H04L 9/06*   (2006.01)
*G06F 8/41*   (2018.01)
*H04L 9/00*   (2022.01)

(52) U.S. Cl.
CPC ............... *G06F 21/14* (2013.01); *H04L 9/06* (2013.01); *G06F 8/41* (2013.01); *G06F 2221/0748* (2013.01); *H04L 9/008* (2013.01); *H04L 2209/16* (2013.01); *H04L 2209/34* (2013.01)

(58) Field of Classification Search
CPC .... G06F 21/14; G06F 8/41; G06F 2221/0748; H04L 9/06; H04L 9/008; H04L 2209/16; H04L 2209/34
USPC ....................................................... 713/189
See application file for complete search history.

(56) References Cited

U.S. PATENT DOCUMENTS

| | | |
|---|---|---|
| 6,278,386 B1 | 8/2001 | Hogan |
| 8,752,032 B2 | 6/2014 | Johnson et al. |
| 9,336,370 B2 | 5/2016 | Chevallier-Mames et al. |
| 9,547,758 B2 | 1/2017 | Hoogerbruggge et al. |
| 2005/0183072 A1* | 8/2005 | Horning ........... G06F 21/14 717/140 |
| 2011/0214179 A1 | 9/2011 | Chow et al. |

(Continued)

OTHER PUBLICATIONS

Appel et al "Modern Compiler Implementation" Chapter 10 Cambridge University Press 2002.

(Continued)

*Primary Examiner* — Michael S McNally

(57) ABSTRACT

Some embodiments are directed to a compiler device (400) arranged for obfuscation of a computer program. The compiler device performs a live variable analysis on the computer program representation, and modifies the computer program representation to encode a first variable using at least a second variable as an encoding parameter.

21 Claims, 4 Drawing Sheets

(56) References Cited

U.S. PATENT DOCUMENTS

2015/0067874 A1   3/2015   Johnson et al.
2016/0117153 A1   4/2016   Fukui et al.

OTHER PUBLICATIONS

S. Muchnick "Advanced Compiler Design and Implementation" 1997 Section 14.1 3 Live Variables Analysis.
International Search Report and Written Opinion from PCT /EP2019/ 068129 dated Oct. 7, 2019.
Ravi Kumar G.K et. al "A Study on Dynamic Data Masking with its Trends and Implications, International Journal of Computer Applications" (0975-8887) vol. 38—No. 6, Jan. 2012.

* cited by examiner

| 1 | | a :=2 |
| 2 | | b := a*b |
| 3 | L1: | c := b/d |
| 4 | | if c < x goto L2 |
| 5 | | e := b /c |
| 6 | | f := e + 1 |
| 7 | L2: | g := f |
| 8 | | h := t −g |
| 9 | | If e > 0 goto L3 |
| 10 | | goto L1 |
| 11 | L3: | return |

COMPILER DEVICE WITH MASKING FUNCTION

CROSS-REFERENCE TO PRIOR APPLICATIONS

This application is the U.S. National Phase application under 35 U.S.C. § 371 of International Application No. PCT/EP2019/068129, filed on Jul. 5, 2019, which claims the benefit of EP Patent Application No. EP 18182155.4, filed on Jul. 6, 2018. These applications are hereby incorporated by reference herein.

FIELD OF THE INVENTION

The invention relates to a compiler device, a compiler method and a computer readable medium.

BACKGROUND OF THE INVENTION

Computer programs handle data in very different environments, including, cloud, personal computers, or embedded devices. Data used or processed by a program can have a high value. For instance: machine-learning algorithms that implement a given functionality may use very specific weights learned during a machine learning process. Reverse engineering of the program can reveal those weights so that an attacker can easily replicate or improve the algorithm functionality without needing access to the data used to train the machine-learning algorithm or to the computing power needed to realizing the training process. Similarly, other attacks can be applied to modify the functionality of a program and affect its availability. For example, grey-box attacks in which an attacker observes timing or power consumption or uses a grey-box fuzzer to detect bugs.

During the last years, there has been a huge advance in different types of protections for the data confidentiality (fully homomorphic schemes and encoding schemes). Also, there are different types of protections for program integrity (e.g., integrity checks of different difficulty) or for program availability.

An example of a state of the art compiling device is provided in U.S. Pat. No. 8,752,032, "System and method of interlocking to protect software-mediated program and device behaviours", included herein by reference.

The known compiler receives the source code of a piece of software and subdivides that source code into various basic blocks of logic. These basic blocks are, based on their contents and on their position in the logic and control flow of the program, amended to increase or create dependence between the various basic blocks. The amendment to the basic blocks has the effect of extending the outputs of some basic blocks while similarly extending the inputs of other corresponding basic blocks, so at to provide interlocks between them. The interlock cause the operation of some part Y of the system to be affected by the operation of some other part or parts X, in such a fashion that tampering with the behavior of part or parts X will cause malfunctioning or failure of the part or parts Y with high probability.

The program may be represented as a Control Flow Graph (CFG). In compilers, the possible flow of control through a program may be represented by a control flow graph (CFG), where a basic block (BB) of executable code (a 'straight line' code sequence which has a single start point, a single end point, and is executed sequentially from its start point to its end point) is represented by a graph node, and an arc connects the node corresponding to a BB U to the node corresponding to a BB V if, during the execution of the containing program, control either would always, or could possibly, flow from the end of BB U to the start of BB V.

Standard obfuscation techniques rely on the obfuscation of values with a fixed parameter stored somewhere in memory. However, values are easily revealed by means of a dynamic analysis of the program. Encodings can be used to protect the algorithms. However, the usage of many encodings to the whole program can lead to a performance penalty and using a single encoding makes the reverse engineering easier.

SUMMARY OF THE INVENTION

A compiler device arranged for obfuscation of a computer program is provided. The compiler device comprises
  a communication interface arranged to receive a computer program representation,
  a processor configured to
    perform a live variable analysis on the computer program representation, the live variable analysis obtaining liveness regions associated with a set of variables allocated in the computer program representation, define-information, and use-information,
    selecting from the set of variables a first variable and a second variable, wherein the second variable is not defined in the liveness region associated with the first variable according to the define-information associated with the second variable,
    modifying the computer program representation at locations defined by the define-information and by the use-information associated with the first variable with encoding code configured to encode the first variable using at least the second variable as an encoding parameter.

The compiler device introduces dynamic protection of values. A second variable whose value is static in a portion of the program is used to protect a first variable in that portion of the program. The first variable is protected with values that depend on the specific execution, making reversing this protection difficult. Especially the automated analysis of white-box, which, e.g., identifies and removes variables that are solely used for masking has difficulty with the obfuscation introduced by the compiler device. The obfuscating variables may be regular variables that occur naturally in the program, and which perform a function in the regular functionality of the program. Removing such a variable would impact the function of the program. Moreover, finding such variables is hard since they serve a useful function in addition to masking or encoding, etc.

The first variables that are protected may be selected automatically. For example, they may be selected randomly, or all or a portion of the variables may be inspected in turn, e.g., to determine if a suitable second variable is available. Particularly important variables may also be indicated by a programmer, e.g., though a compiler directive. It turns out that through automated application of the compiler device many variables can be obfuscated in this manner. In particular, embodiments are advantageous in obfuscating local variables, e.g., variables with small liveness regions. For example, in an embodiment the first variable may be selected from a set of variable that have small liveness regions, e.g., that at most a threshold number of blocks. The threshold may be, say, 2, 4, or the like.

In an embodiment, the first variable is selected from the set of variables according to a function, e.g., in turn according to a ranking computed by the function. The function may be random or have a random component. The function may comprises heuristics.

Embodiment may be applied to variables, e.g., as defined in a source code program, to variables as defined in an intermediate representation, or even to pseudo registers. Pseudo registers may also be referred to as virtual of symbolic registers.

Protection can be based on masking. For example, XOR masking, addition and subtraction, e.g., modulo a modulus, etc. Other functions that are invertible for a fixed encoding parameter may be used. Protection can be based on an encoding such as RNS whose secret parameters depend on the first variable. The encoding may also be implemented through a look-up table or through a polynomial. For example, in an embodiment, the first variable is masked with the second variable. For example, in an embodiment, the first variable is encoded by applying an encoding table to the first variable, the table receiving the second variable as input as an encoding parameter, e.g., a key.

In an embodiment, the encoding code may be configured to encode the first variable in a residue number system, wherein the moduli of the residue number system are derived at least in part from the second variable. The residue number system may be applied to multiple first variables each encoded with respect to the same second variables.

In an embodiment, modifying the computer program representation comprises replacing an operation on an encoded first variable with an encoded operation. For example, multiple first variables may be encoded with the same second variables. Computation on the encoded variables may be performed entirely in the encoded domain.

The compiler device is an electronic device. It may be a computer, e.g., a desktop, a laptop, a server or the like. The compiler method described herein may be applied in a wide range of practical applications. Such practical applications include the protection of software that comprises a proprietary algorithm, cryptographic code, the protection of keys, the protection of financial software, etc.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of an encoding, FIG. 2 schematically shows an example of an embodiment of an encoding, FIG. 3a schematically shows an example of an embodiment of computer program representation, FIG. 3b schematically shows an example of an embodiment of a computer program representation, FIG. 4a schematically shows an example of an embodiment of a compiler device, FIG. 4b schematically shows an example of an embodiment of a compiler device, FIG. 5 schematically shows an example of an embodiment of a compiler method, FIG. 6a schematically shows a computer readable medium having a writable part comprising a computer program according to an embodiment, FIG. 6b schematically shows a representation of a processor system according to an embodiment.

LIST OF REFERENCE NUMERALS IN FIGS. 1-4b, 6a-6b 210 a program execution flow
212 a first set of variables
214 a second set of variables
310 computer program
320 a control flow graph
321-323 a basic block
400 a compiler device
410 a memory
420 a processor
431 a communication interface
432 a first compiler part
433 a second compiler part
440 a computer program representation
442 a set of variables
444 associated liveness regions
450 a liveness analyzer
460 a variable selector
462 a code modifier
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

Figure 1:
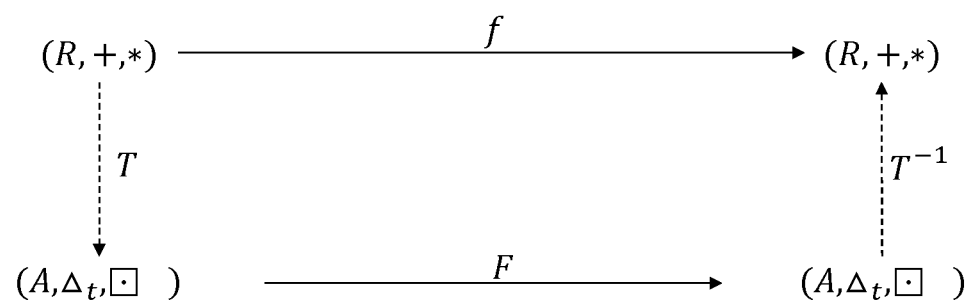

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

There are many ways to obfuscate the values of variables used in a program. For example, obfuscation protects a program by creating confusion. A technique to hide the value of a variable comprises using a static value stored in the program to hide the value of the variable. For instance, consider the following program fragment, which was obfuscated without using liveness analysis or the selection of a first and second variable. Instead a variable 'mask' is added with the purpose of masking later occurrences of sensitive variables.

Mask=0x18AE762C9
Variable=confidential_value XOR Mask
. . . [program] . . .
Variable=Variable XOR Mask
Variable=Function(variable) XOR Mask
. . . [program] . . .

In this case the mask is a static or fixed value stored in the program. A confidential value in the program can be masked, e.g., XOR-ed with the mask. As result, after compilation the confidential value in the second line in no longer explicitly stored in the compiled program. When the value is later used it may be unmasked with the mask, e.g., XOR-ed again so that the plain value becomes available, but only as a computed value, generated only during execution.

To further complicate this type of obfuscation, one may use dynamic masks in which the value used to obfuscate is returned by a function instead of a static value. However, such an approach is still easily attackable since the function can be modified, e.g., to always return "0".

FIG. 1 schematically shows an example of an embodiment of an encoding. Encoding schemes, e.g., arising from the field of white-box cryptography have been designed in order to make the reverse engineering of an algorithm and its data more difficult. Encodings can be based, e.g., on (i) nibbles, (ii) residual number systems, or (iii) algebraic transformations. FIG. 1 shows an abstract representation of operations realized in the encoded domain. Instead of evaluation function f( ) over the ring of integers (R,+,*), the elements in R are transformed by means of transformation T( ) into a different domain A such that the same function f( ) can be implemented based on elements represented in A and alternative operations $\Delta_r$, □. This implementation is denoted as F( ). Such a scheme is to some extent similar to (fully) homomorphic encryption ((F)HE) schemes in the sense that T( ) can represent the usage of a public-key to encrypt data, operations realized in F( ) involve encoded operations and some type of evaluation key, and the inverse transformation is equivalent to the usage of the private key. However, there are still key differences, e.g., the usage of the transformations T( ) and T−1( ) are usually merged in the code itself and the difficulty of extraction relies on the difficulty of reverse-engineer the larger tables implementing them.

Standard obfuscation techniques rely on the obfuscation of values with a fixed parameter stored somewhere in memory. However, values are easily revealed by means of a dynamic analysis of the program, e.g., by analyzing how the value evolves when the program is executed since at some point of time the obfuscation needs to be removed to perform the operations. Encodings can be used to protect the algorithms. However, the usage of many encodings to the whole program can lead to a performance penalty. Thus, in some cases it is preferred to use a few, even a single, encoding. In this case, reverse engineering of the program is easier since an attacker only has to figure out that specific encoding.

In an embodiment, a different approach is used. A first set of variables is protected using, e.g., obfuscation or encodings. Protection is achieved by using a value derived from a second set of variables used in the program. The second set of variables comprises variables that are determined to be static while they are used for protecting the first set of variables. Since obfuscation of a variable is done by using another variable, then the proposed obfuscation technique is more resilient against dynamic analysis than known in the state of the art.

Figure 2:
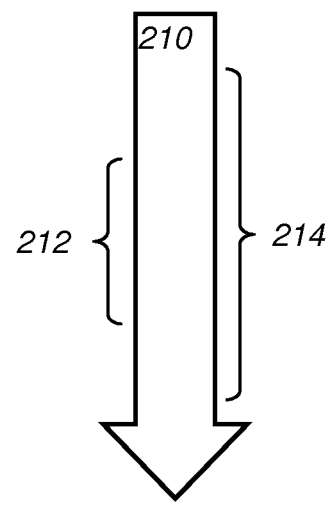

This idea is illustrated in FIG. 2. Shown in a program execution flow 210. A first set of variables 212 is selected which are to be protected. FIG. 2 shows at the left the region where the first set of variables 212 are live, e.g., the region in which their values may be defined or used. To protect the first set a second set of variables 214 is identified. The set of variables 214 are variables that happen to have no defines in the liveness region of set 212. The region in which the second set of variables remains static is shown at the right of FIG. 2. Otherwise, the set 214 may be ordinary variables that are defined and used in the program for reasons unrelated to the protection, e.g., to perform the function of the program.

The set of variables 212 may be protected, e.g., masked, encoded, by means of a value V derived from a set of variables 214 that remains static at least during the protection scope of set 212. The protection can be based on obfuscation, e.g., using V to XOR the variables in set 212 so that their value is not stored in the clear. The protection can also be based on encodings, and the encoding may depend on V. For instance, V can be used to obtain the secret moduli used in an RNS encoding.

Figure 4A:
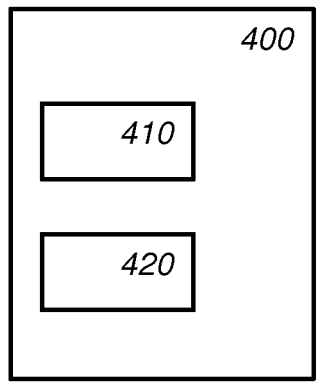

FIG. 4a schematically shows an example of an embodiment of a compiler device 400. For example, compiler device 400 may be a computer, e.g., a desktop computer, a server, a laptop, netbook, or the like. Compiler device 400 may be a mobile device, e.g., a mobile phone, a PDA, etc. Compiler device 400 may be a smart card, set-top box, television, etc.

Compiler device 400 comprises a memory 410. Memory 400 is a volatile memory which may store one or more of a computer program representation, compiler software, computer program compilations. For example, memory 410 may be a RAM memory. Compiler device 400 may have additional memory, e.g., non-volatile memory, e.g., ROM memory, and/or volatile memory, etc.

Compiler device 400 comprises a processor 420 to implement methods according to an embodiment. For example, memory 410 may store computer instructions arranged for execution by the processor. This is not necessary however; for example, compiler device 400 may comprise a storage interface configured to access computer code, e.g., compiler code. The processor may be configured to access the operating system code and/or compiler code through the storage interface and to execute said code. The storage interface may be an interface to local storage, e.g., a local memory, a hard disk, etc., or to non-local storage, e.g., a cloud storage. Memory 410 may comprise data on which the processor acts.

The operation of the computation device in various embodiments may be implemented in a processor, e.g., a processor circuit, examples of which are shown herein. Some of the figures below show functional units that may be functional units of the processor. For example, FIG. 4b may be used as a blueprint of a possible functional organization of the processor. The processor circuit is not shown separate from the units in FIG. 4b. For example, the functional units shown in the figures may be wholly or partially implemented in computer instructions that are stored in the memory of the device, e.g., in an electronic memory of the device, and are executable by a microprocessor of the device. In hybrid embodiments, functional units are implemented partially in hardware, e.g., as coprocessors, and partially in software stored and executed on the device. The processor may comprise multiple sub-processors, which together form the processor. For example, the processor may comprise multiple processor circuits.

Compiler device 400 may comprise additional hardware and/or software elements, depending on the application of compiler device 400. For example, compiler device 400 may comprise a communication interface for communication over a computer network, or a display interface, for displaying computation results on a display connectable to compiler device 400.

For example, compiler device 400 may communicate over a computer network. The computer network may be an internet, an intranet, a LAN, a WLAN, etc. The computer network may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The device may comprise a connection interface which is arranged to communicate with other electronic devices, e.g., other computing and/or compiling device as needed. For example, the connection interface may comprise a connector, e.g., a wired connector, e.g., an Ethernet connector, or a wireless connector, e.g., an antenna, e.g., a Wi-Fi, 4G or 5G antenna. For example, the device 400 may comprise communication interface 431.

Figure 4B:
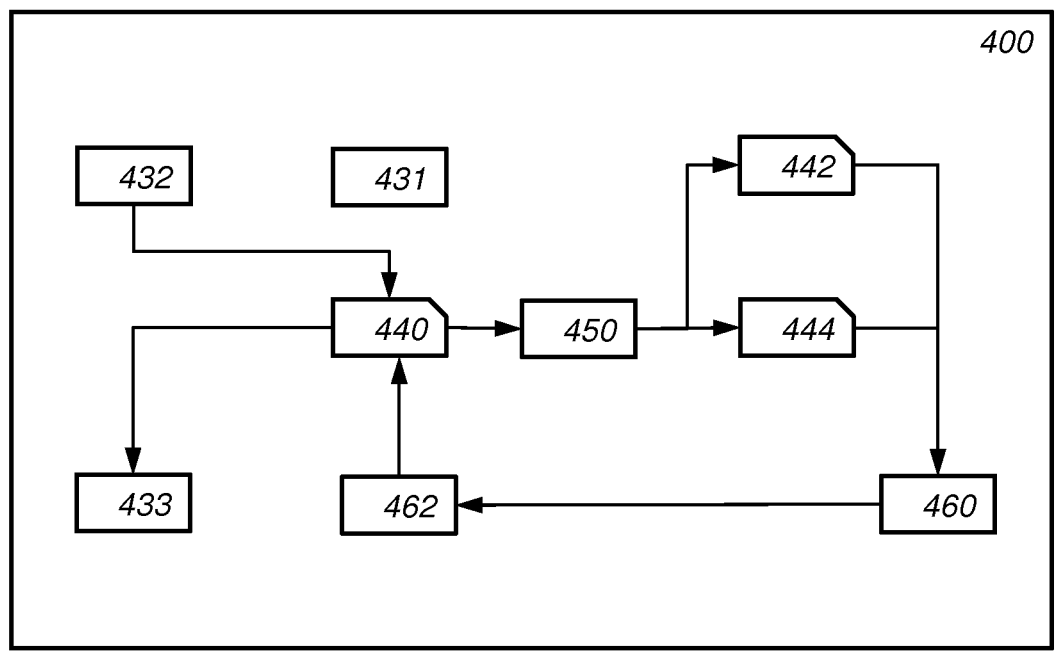

FIG. 4b schematically shows an example of an embodiment of a compiler device 400.

Compiler device 400 comprises a communication interface 431 arranged to receive a computer program representation. For example, the computer program representation may be received from a computer network or from a computer storage, etc. For example, the communication interface 431 may be a computer network interface or a computer storage interface, respectively. For example, the computer program representation could be written in a computer language, e.g., as so-called source code. For example, the computer program representation may be a source code file. For example, the source code could be written in a high-level computer program language such as C, C #, C++, Swift, Java, F #. For example, a computer program representation may comprise a linear sequence of statements, e.g., written in text.

The computer language representation may be written in an intermediate compiler language. For example, intermediate compiler languages include such languages as Register transfer language (RTL), Medium Intermediate Language Representation (MIR), Low intermediate language representation (LIR). The latter two languages are described in the "Advanced Compiler design & Implementation" by S. Muchnick. These intermediate languages, may be linearly organized or flat, e.g., as a sequence, e.g., an array or the like, of statements, e.g., language elements. In intermediate languages things such as loop control structures may no longer be available, array access may be expressed in terms of pointer offsets, and variables may already have been assigned to (symbolic) registers.

The computer language representation may also be in form of a directed graph, e.g., not linearly ordered. For example, the computer language representation may be a so-called control flow graph. A control flow graph (CFG) is a direct graphs which may have basic blocks B1 . . . Bn as nodes. There is a directed edge B1→B2 if control can flow from B1 to B2. The computer language representation may be in static single assignment (SSA) form; although this is not necessary. A control flow graph may be an intermediate representation; a representation of a program part way between the source and the target machine language. Instead of basic blocks a CFG could have smaller program parts as nodes, e.g., individual statement as basic blocks; or larger program parts, e.g., extended basic blocks.

A CFG may be built by dividing the intermediate code, e.g., of each procedure, into basic blocks. A basic block is a piece of straight line code, e.g., there are no jumps in or out of the middle of a block. The CFG may have one or more special nodes, such as ENTER and EXIT that are the source and sink of the graph. Inside each basic block can be any known intermediate representation, e.g., tuples, trees, DAGs, etc.

The various possible representations of the computer program may be converted to or from each other. For example, a control flow graph may be generated from a representation in a computer program language, e.g., a source code language and/or a compiler intermediate language, or vice versa.

In an embodiment, device 400 comprises a first compiler part 432. For example, first compiler part 432 may be configured to receive a first computer program representation and to generate a second computer program representation. For example, the first and second representation may be in a different language. For example, the first computer program representation may be a linear language, whereas the second computer program representation may be a tree, e.g., a control flow graph. For example, the first computer program representation may be a source code langue, e.g., a high level language, and the second computer program representation may be in a compiler intermediate language.

For example, in an embodiment, the first compiler part 432 may comprise: a parser, a semantic analyzer, and a code generator. The code generator may be, e.g., a LIR generator, a CFG generator, and the like. The first compiler part 432 may comprise an optimizer, a register allocator, etc.

First compiler part 432 may change the number of variables. For example, a variable may be eliminated, e.g., through dead code elimination, strength reduction, etc. For example, some variables may be introduced, e.g., a single variable may be split over multiple variables, temporary variables may be introduced, etc.

In an embodiment, communication interface 431 may be an internal interface, e.g., an application programming interface. For example, the communication interface 431 may receive an intermediate form of the computer program, e.g., already in a compiler intermediate language, or a tree form such as CFG and/or SSA. For example, the compiler device may be used as a part, e.g., a sub-routine of a further compiler device.

Figures 3A, 3B:
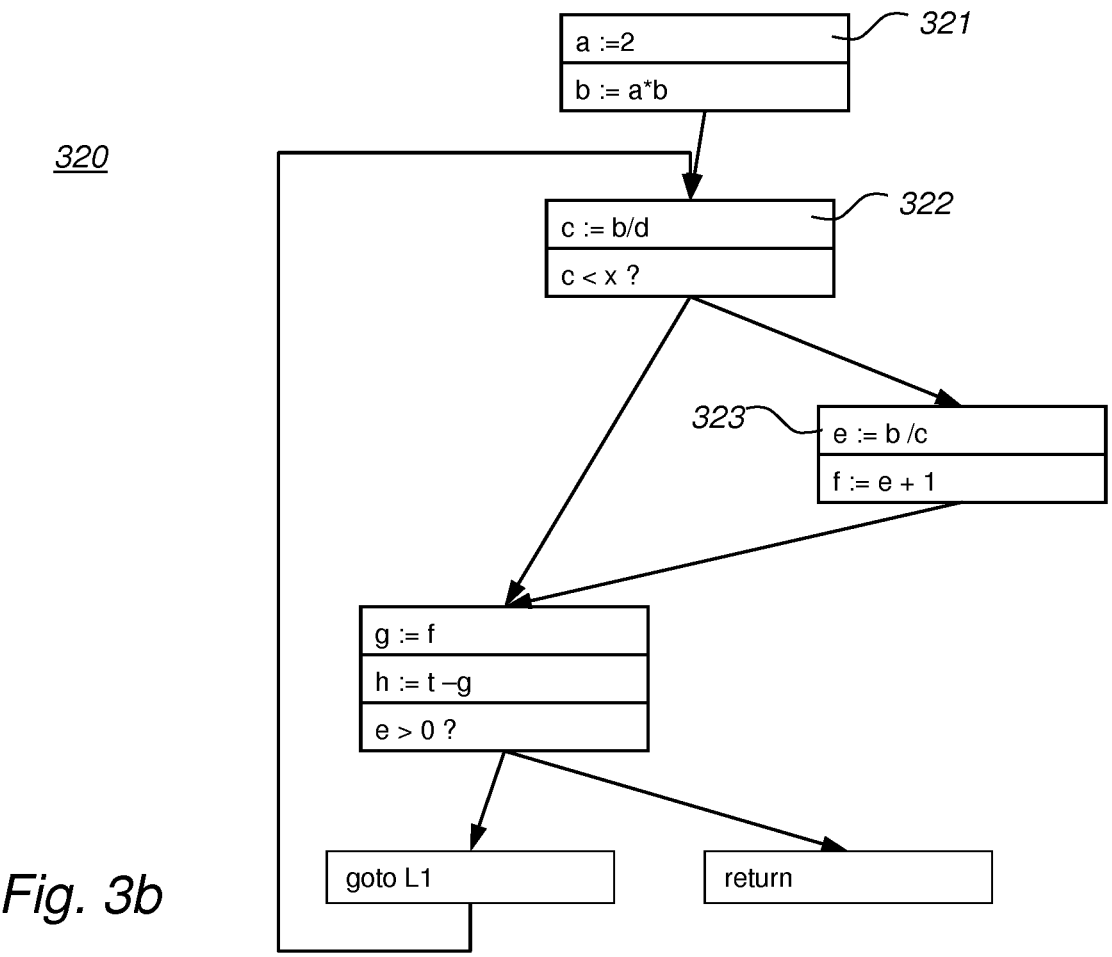

In an embodiment, the computer program representation is a control flow graph. The CFG may be received at communication interface 431, or may be produced by first compiler part 432. For example, FIG. 3a shows an example of a fragment of a computer program 310 in a linear language, sometimes referred to as a flat representation. The language may be a high-level source code language or a compiler intermediate language. The final line in program 310 is marked 'return', e.g., to indicate the return from a sub-routine. Instead, the program fragment could also be continued, e.g., with additional program statements, etc.

FIG. 3b shows a control flow graph 320 generated from program representation 310. The computer program representation may be part of a larger computer program, e.g., a routine, procedure, unit, library, or the like. Instead of basic blocks another division into parts of the computer program may be used, e.g., extended basic blocks. The CFG of FIG. 3b has nodes which comprise a basic block. For example, CFG 320 comprises 6 basic blocks, three of which are marked: basic block 321, 322 and 323.

Compiler device 400 comprises a liveness analyzer 450. Liveness analyzer 450 is configured to receive a computer program representation 440, e.g., from first compiler part 432 or from communication interface 431. Liveness analyzer 450 is configured to perform a live variable analysis on computer program representation 440. The live variable analysis may generate liveness regions 444 associated with a set of variables 442 allocated in the computer program representation 440. The set of variables 442 may be generated by liveness analyzer 450 as well, or may be generated by another entity. The set of variables 442 may also be part of the computer program representation 440, either explicitly, e.g., as a set of allocations, etc., or implicitly, e.g., as defined by their use.

Liveness analyzer 450 may generate define-information and use-information for the set of variables. For example, define-information may indicate where a variable is written; use-information may indicate where the variable is read. For example, the define-information may comprise when a variable is defined, e.g., declared, and/or changed.

The set of variables 442 may be, e.g., all variables, e.g., in an undetermined order. The set of variables 442 may be a subset of all variables, optionally in an order according to a heuristic such as the range of the variables or the liveness range.

For example, computer program representation 440, e.g., a control flow graph, may comprise a set of basic blocks, e.g., basic block nodes. The liveness regions and define/use-information may be associated with the basic block, e.g., with nodes in the CFG. Alternatively, liveness information may be associated with edges in a CFG.

In compiler theory, live variable analysis (also referred to as liveness analysis) is a data-flow analysis performed by compilers to calculate for each program point the variables that may be potentially read before their next write, e.g., the variables that are live at the exit from each program point. A variable may be considered live if it holds a value that may be needed in the future.

Liveness analysis is preferably done on a per statement basis. For example, for each statement that either writes or reads from one or more variables, it may be determined which variables are live at that point. Liveness analysis may be done when the computer program representation is partitioned in basic blocks; the liveness analysis may be done for each statement in the basic blocks. For example, the basis blocks may be the nodes of the CFG. Instead of using the CFG for liveness analysis, the analysis could also be done directly on flat program code, e.g., on fragment 310.

It is allowed that the liveness analysis over-estimates the number of live variables. This may remove some possible maskings from consideration but will not affect the correctness of the modified program. The liveness analysis may be imprecise, as long as the result live sets are too large, and therefore the not-live sets across each statement are too small.

For example, the liveness analysis may be done per block or per statement, e.g., per line. The latter may be advantageous since a finer grained liveness region is obtained. Liveness analysis may also be done on a per-block basis; however live or not-live information at block boundaries alone may not be sufficient. For example, a liveness analysis on block boundaries may assign to each basis block B, the set use(B) of variables that are used in B before they are written, the set def(B) of variables that are written in B, the set in(B) of variables that are live at the start of B, and out(B), the variables that are live at the end of B. The sets in( ) and out( ) are defined using recursive equations: in(B)=use(B)∪(out(B)−def(B)) and out(B)=∪$_{S \in succ(B)}$in(S). Succ(B) are the successor nodes of B. These equations can be satisfied by iterating over the basic blocks, and updating in(B) and out(B) until the equations are satisfied for all blocks. Liveness analysis may, e.g., use the algorithm in Muchnick, section 14.1.3, "Live variables analysis", or the liveness algorithms in chapter 10 ("liveness analysis") of "Modern Compiler Implementation in C" by Andrew W. Appel, Maia Ginsburg.

After a liveness analysis on the block level, liveness on the statement level can be obtained. For example, a backward traversal of the block may be done, initialized with the live-out set of the block is used to determine live variables across each statement. It is possible to store imprecise information (too many live) at for instance block boundaries, but the not-live set is preferably determined at instruction level granularity. Note that variables may be not-live at block boundaries, but live inside the block. For example, to estimate liveness for a given variable x, it may be considered live in those blocks B, where x occurs in one of in(B), out(B), or use(B).

For example, liveness analysis may be done in a backwards analysis. The analysis is done in a backwards order, and the dataflow confluence operator is set union. In other words, if applying liveness analysis to a function with a particular number of logical branches within it, the analysis is performed starting from the end of the function working towards the beginning, and a variable is considered live if any of the branches moving forward within the function might potentially need the variable's current value.

For example, liveness analysis on CFG 320 finds that variable c is in out(Block 322), in(Block 323). We may conclude that the liveness region for variable c is blocks 322 and block 323. A closer analysis, e.g., on the level of individual statements may change the liveness region though. For example, variable c is not used in the second line of basic block 323, so that the liveness region of variables c may be defined as the block 322 and the first line of block 323. Note that in(Block 321) are the variables b, d, x, t, f, e; presumably these variables are defined in another fragment of the computer program 310.

For example, considering CFG 320, the set of variables 442 may be {a, b, c, d, e, f, g, h, x}. For example, the liveness region for variable c may be blocks 322 and 323, because variable c is out(Bock 322) and in(Block 323). Set 442 may be restricted according to heuristic rules. For example, a variable, say variable x, may be omitted from set 442 if the variable is only defined in a different program unit, e.g., a library or the like, e.g., a global variable with is essentially constant, e.g., defined in a system library, e.g., never or rarely changed.

The liveness regions may be stored implicitly. For example, in an embodiment, after the analysis algorithm all the variables that are live at a specific point in the program are determined. So the points in the code that belong to the liveness region of a variable are known. For example, the computer program representation 440 may be extended with liveness information. For example, the nodes, or lines or elements of computer program representation 440 may be associated, e.g., tagged, with information that indicates which variables are live at that point. The associated information may also include define and use-information. Alternatively, one or more or all of the liveness regions, define and use-information may be stored externally from computer program representation 440. For example, the set of variables 442 may have associated information about liveness, define and use. For example, set of variables 442 and information associated with the variables about liveness, define and use may be stored in a list, or data base, or the like.

If the computer program representation is linear, e.g., flat, e.g., like a text file, liveness of a variable x may be determined as the first program point p1 where variable x is defined, and the last program point p2 where variable x is used. A consequence of this representation is that too many variables may be indicated as live across a statement, and therefore the not-live set may be too small. This does not violate correctness in however case, although there may be fewer masking possibilities.

It is possible to partition lifetimes of a variable if the variable is defined at multiple locations, and mask each of these lifetimes separately. However, such an approach is equivalent to first applying an SSA transformation and then applying the liveness analysis followed by the masking algorithm.

Compiler device 400 comprises a selector 460. Selector 460 is configured to select from set of variables 442 a first variable and a second variable, wherein the second variable is not defined in the liveness region associated with the first variable according to the define-information associated with the second variable.

For example, consider variable c as the first variable. Taking liveness on basic block levels, e.g., basic blocks 322 and 323, selector 460 may select as the second variable any one of variables: a, b, d, g, h, x, since none of these variables are defined in blocks 322 and 323. For example, taking variable b as the second variable, then blocks 322 and 323 (lines 3-6 of fragment 310) may be rewritten as:

c:=ENC (b/d, b)
if DEC(c, b)<x goto L2
e:=b/DEC(c, b)
f:=e+1

In the above case the first variable c is encoded using the variable b as an encoding parameter and decoded using the same variable b. In this case an encoding operation is used where first variable c is encoded and a decoding operation is used where c is used.

The rewriting may be done by a code modifier 462 of device 400. Code modifier 462 may be configured to modify the computer program representation at locations defined by the define-information and by the use-information associated with the first variable with encoding code configured to encode the first variable using at least the second variable as an encoding parameter. The parameters after the first parameters of ENC and DEC are used here as the encoding parameter. They have the property that DEC(ENC(x, $y_1, \ldots, y_n$), $y_1, \ldots, y_n$)=x.

For example, code modifier 462 may obtain from the define-information and the use-information that variable c is defined and/or used in lines 1 and 2 of block 322 and line 1 of block 323. Alternatively, the define-information may point to lines 3-5 of fragment 310. In this case, code modifier 462 inserts an encoding routine where the first variable is defined and a decoding routine where the first variable is used.

The liveness analysis may be imprecise, as long as the result live sets are too large, and therefore the not-live sets across each statement are too small. If the liveness analysis is done on a smaller granularity, e.g., on the level of statements, e.g., in program 310, it may be found that variables e, and f, although they are defined in block 323 may still be used to encode variable c, since the liveness region of the latter does not extend to the final statement of block 323. Accordingly, fragment may be modified as:

c:=ENC (b/d, e+f)
if DEC(c, e+f)<x goto L2
e:=b/DEC(c, e+f)
f:=e+1

In the above example, a value derived from multiple second variables is used as an encoding parameter; in this case the value e+f derived from second variable e and f.

The second variable or variables may be randomly selected. For example, selector 460 may determine multiple second variables from which a variable is randomly selected. For example, in this case, selector 460 may select a random variable from variables: a, b, d, g, h, x.

In an embodiment, selector 460 may apply a heuristic to select one or more second variables. For example, in an embodiment, selector 460 may select a second variable having a use closer to the liveness region of the first variable. For example, variable d and x are used in the liveness region of variable c, which is closer than variables a, b, g, h which are used in a block at distance one from the set of blocks in the liveness region of variable c.

Likewise, selector 460 may select a second variable having a define closer to the liveness region of the first variable, more preferably a non-constant define. For example, variables a, b, g, h are defined in a block at distance 1, whereas variables d,x are not defined in this program fragment.

For example, selector 460 may assign different weights according to different heuristics, and rank the variables in set 442 according to the sum of the weights. One or more variables may be selected as second variable that have a high rank, e.g., the highest or above a threshold, etc.

In an embodiment, selector 460 selects multiple second variables and code modifier 462 uses multiple second variables as encoding parameters. For example, the same program code lines may be rewritten as:

c:=ENC (b/d, b, d)
if DEC(c, b, d)<x goto L2
e:=b/DEC(c, b, d)
f:=e+1

In above case using an encoding and decoding function that takes multiple encoding and decoding parameters. Alternatively, the code may be rewritten as:

l:
V1:=ENC_PARAM (b, d)
c:=ENC (b/d, V1)
V2:=ENC_PARAM (b, d)
if DEC(c, V2)<x goto L2

V3:=ENC_PARAM (b, d)
e:=b/DEC(c, V3)
f:=e+1
or as
II:
V:=ENC_PARAM (b, d)
c:=ENC (b/d, V)
if DEC(c, V)<x goto L2
e:=b/DEC(c, V)
f:=e+1

In the above cases I and II an encoding parameter is computed from multiple second variables, which is used as an encoding or decoding parameter for the first variable. In the first option I, the encoding parameter is computed, e.g., each time it needed, or at least multiple times. In the second option II, the encoding parameter is computed once, e.g., before the first encoding operation. Encoding and decoding operation may advantageously be done using a look-up table or a polynomial function taking the first and second variables as input. For example, to encode a first variable c with a second variable y, one may use Enc(c,y)=table[c][y].

In an embodiment, the encoding/decoding may be a masking operation. For example, the code may be rewritten as:
c:=(b/d)+b
if c−b<x goto L2
e:=b/(c−b)
f:=e+1

In the above case the masking is arithmetical masking, an XOR operation may be used instead.

In an embodiment, selector 460 only selects second variables that are defined before the liveness region of the first variable, e.g., that are live in the liveness region of the first variable. An advantage of this choice is that a regular compiler can be used for the second compiler part. For example, code modifier 462 may modify a flat program code, possibly intermediate, possibly high-level; device 400 may use a conventional compiler to finish the compilation, e.g., in a second compiler part 433. In an embodiment, it is possible to use variables before they are defined, so long as they are constant during the first variables liveness region. However, using a variable before it is defined may confuse the conventional compiler, e.g., lead to warnings or errors.

In an embodiment, selector 460 may select multiple first variables. For example, the selected first variables may have the same liveness region, or an overlapping liveness region, or liveness regions that are within a threshold, e.g., that are within 2 basic blocks. The one or more second variables that are selected by the variables selector 460 are not defined in the liveness regions of any of the first variables.

In an embodiment, the code modifier 462 is configured to encode the first variable in a residue number system, wherein the moduli of the residue number system are derived at least in part from the second variable. Using a residue number system is particular advantageous for multiple first variables. For example, the program code may be rewritten as:
V1:=RNS_MODULUS (b)
V2:=RNS_MODULUS (d)
c:=RNS_ENC (b/d, V1, V2)
if RNS_DEC(c, V1, V2)<x goto L2
e:=b/RNS_DEC(c, V1, V2)
f:=e+1
or alternatively
V:=RNS_MODULI (b, d)
c:=RNS_ENC (b/d, V)
if RNS_DEC(c, V)<x goto L2
e:=b/RNS_DEC(c, V)
f:=e+1
or alternatively
V:=RNS_MODULI (b, d)
c:=RNS_ENC (b/d, V)
x1:=RNS_ENC (x, V)
if RNS_CMP(c, x1) goto L2
e:=b/RNS_DEC(c, V)
f:=e+1

In the second option the encode parameter V is a set of multiple encode parameters, in this case, multiple RNS parameters. In the third option, the variable x is not used as a first variable, e.g., because it has a too large liveness region, but it is temporarily encoded so that it can be used as an encoded input together with an encoded first variable. For example, in an embodiment the compiler device, e.g., selector 460, is configured to select one or more further variables that are used but not defined in the liveness region of the first variable. The one or more further variables may be encoded with a second variable. For example, the encoded further variable is no longer used outside the liveness region of the first variable. For example, dead code elimination optimization may remove the encoded further variable. It is safe to discard the encoded further variable after use, e.g., without decoding, since the further variable is static in this region.

It may be avoided to compute the RNS moduli explicitly. Computing RNS moduli may be integrated in the encoding/decoding or computation functions. For example, the code may be rewritten as follows:
c:=RNS_ENC (b/d, b, d)
x1:=RNS_ENC (x, b, d)
if RNS_CMP(c, x1, b, d) goto L2
e:=b/RNS_DEC(c, b, d)
f:=e+1

In the code above, the RNS encoding and decoding operations take one or more encoding parameters, in this case 2: b and d. The RNS operations such as compare operate without decoding, they may take the encoding parameter(s) as input as well. For example, the encoding code, decoding code and/or operating code may take the encoding parameter(s) as input and be configured to compute the RNS moduli therefrom, e.g., taking the encoding parameter(s) as a seed. An advantage is of this approach is that the moduli do not need storage outside of the RNS operations. In RNS, some operations can be performed without decoding. For example, RNS_ADD does not need decoding.

For example, code modifier 462 may obtain the location or locations where a variable is defined and add encoding or masking code. For example, in a define c:=f($x_1$, . . . , $x_n$), an encoding may be added at the outer level, so that the first variable c is encoded, e.g., c:=ENC(f($x_1$, . . . , $x_n$),encoding variable(s). For example, code modifier 462 may obtain the location and/or locations where a variable is used and add decoding or de-masking code. For example, in a use y:=g(c, . . . ) a decoding may be added to the first variable, e.g., y:=g(DEC(c,encoding variable(s) . . . ).

In an embodiment, code modifier 462 may be configured to replace an operation on an encoded first variable with an encoded operation. For example, in an embodiment, multiple different first variables may be identified which are protected with the same second variable(s); say variables $c_1$, $c_2$ and $c_3$ are all encoded with the same one or more variables v.

An operation $c_1$=f($c_1$,$c_2$) on un-encoded first variables may be replaced by $c_1$=F($c_1$,$c_2$) or $c_1$=F($c_1$,$c_2$,v). Herein the function F takes an encoded variable as input and produces an encoded variable as output. If the function outputs to a non-encoded variable a function may be used that takes encoded variables as input and produces a non-encoded output, e.g., $d=F(c_1, c_2, v)$, wherein d is not encoded. For example, using masking as an example, c1, c2, c3, c4 as first variable, v as on or more second variables, and d as an unencoded variable, the following program fragment c1:=a
c2:=b
c3:=ADD (c1, c2)
d:=ADD (c3, c2)
c4:=ADD (c1, d)
may be encoded as (I)
c1:=ADD (a, v)
c2:=ADD (b, v)
c3:=ADD (SUB(c1, v), SUB(c2, v), v)
d:=ADD (SUB(c3, v), SUB(c2, v))
c4:=ADD (SUB(c1, v), d)
but also as (II):
c1:=ADD (a, v)
c2:=ADD (b, v)
c3:=ADD_1 (c1, c2, v)
d:=ADD_2 (c3, c2, v)
c4:=ADD_3 (c1, d)

In example (I) an encoding operation is added to each define of a first variable, in this case the encoding is arithmetic masking, and a decoding operation is added to each use of a first variable, in this case the decoding is arithmetic demasking.

In example (II), an operation is identified on first variables which defines a first variable, c3:=ADD (c1, c2). The operation, ADD, is replaced by an operation, ADD_1, which takes encoded variables as input and produces an encoded variable as output. In this case, ADD_1 may be defined as c1+c2−v.

Furthermore, an operation is identified on first variables which defines a non-encoded variable, d:=ADD (c3, c2). The operation, ADD, is replaced by operation, ADD_2 which takes encoded variables as input and produces an un-encoded variable as output. In this case, ADD_2 may be defined as c1+c2−2v.

Other combinations of encoded and/or non-encoded inputs and/or encoded and/or non-encoded outputs are also possible. For example, the operation c4:=ADD (c1, d) has mixed encoded inputs and an encoded output. The operation, ADD, may be replaced by an operation, ADD_3, which takes the combination of encoded and unencoded variables as input and produces an encoded variable as output. In this case, ADD_3 may be defined as c1+d.

Note that in these examples, the replaced operations sometimes take the second variable as input, and sometimes they do not. Replacing of operations is especially advantageous for homomorphic encoding in which operations may be performed in the encoded domain. For example, the encoding may be converting a number to an RNS number system, with moduli that depend on one or more second moduli. Operation on the RNS encoded numbers can be replaced with RNS operations; e.g., an addition or multiplication may be replaced by an RNS addition or multiplication, etc.

As an example consider the following typical C programming fragment

```
(...)
for (int i = 0; i<=10; i++)
{
  for (int j = 0; j<=10; j++)
  {
    data[i,j] = 0;
  }
}
(...)
```

The liveness analyzer may find that variables i and j have approximately the same liveness region, e.g., their liveness region overlaps, and their difference is within a threshold. Accordingly, variables i and j could be encoded in an RNS number system with moduli depending on a second variable (not necessarily shown above). All computations the loop indices could be performed on the encoded variables. The variables may be decoded though, e.g., to compute a pointer into the array. Note that conversion to intermediate code may introduce an additional temporary variable, e.g., to compute the pointer to the array at the appropriate index.

In an embodiment, the compiler device is configured to select multiple first variables, wherein the first variables have an overlapping liveness region, and one or more second variables. Each one of the multiple first variables may be encoded with the one or more second variables. Additional restrictions may be imposed on the first variables. For example, first variables may be determined for which their liveness regions are close, e.g., the distance between two liveness regions of two first variables may be small, e.g., at most a threshold. The distance may be the number of basic blocks that is in only one of the liveness regions. Furthermore, first variables may be selected that share an interaction, for example, that occur together in a use statement; e.g., the array assignment in the example above.

In an embodiment, the selector is configured to select one or more first variables that are defined local to a loop, e.g., within a procedure.

In an embodiment, there may be multiple variables in set 442. A potential first variable may be selected from set 442, e.g., at random, or by considering the variables in set 442 in turn. For a potential first variable it may be determined if a second variable exists, e.g., if a second variable in set 442 exists that is static during the liveness region of the first variable. If no such second variable exists, then the potential first variable may be discarded and a next potential first variable may be selected and tried, e.g., until a suitable first variable or variables and second variable or variables are found.

The selection of a first variable may also be influenced by a programmer. For example, a compiler directive may be inserted in a computer program representation, e.g., in a high-level source code representation. For example, the directive may be #protect. The selector 460 may be configured to first find one or more second variables for variables having the directive. If no such second variable may be found, a warning signal may be generated. The warning signal may be shown on a display. Another compiler directive may be #confidential. If this directive is used, then the variable marked with this directive should not be used as a second variable since this might be, e.g., a password.

Compiler 400 may be configured to run multiple iterations on computer program code representation 440. For example, multiple iterations of selecting a first and second variable, and modifying the code. Through the iterations the computer program becomes increasingly obfuscated. Obfuscation according to an embodiment may be combined with conventional obfuscations. For example, an obfuscation unit may introduce dummy variables, dummy code, encode variables, replace functions with tables, complicating control flow, etc. In particular, obfuscation according to an embodiment may be combined with conventional masking with a dedicated masking variable. For example, in an embodiment, a first and second variable may be selected using liveness analysis. The first variable may be encoded using the second variable and a fixed masking constant.

Embodiments protect against automated de-obfuscation, and scraping attacks. A scraping attack aims to recover a key by trying all values in a program as a potential key, without trying to interpret the program.

After modification of computer program representation 440 the compilation may be completed, e.g., by a second compiler part 433. For example, second compiler part 433 may perform code generation, e.g., mapping the computer program representation 440 to the target language, e.g., a machine language. However, the second compiler part 433 may perform additional compilation steps, e.g., optimization, register allocation and the like. Note that liveness analysis may be done multiple times in compiler device 400, e.g., in first compiler part 432, second compiler part 433, e.g., for other purposes, e.g., for optimization, register allocation and the like.

Register allocation refers to the process of assigning (physical) registers to the variables in the IR. This is important since in an IR there might be many variables alive at the same time, but a computer has a limited number of registers. Register allocation is realized by means of liveness analysis, e.g., analysis of the livetime of the variables.

For example, in an embodiment the first compiler part 432 may be arranged for parsing and intermediate code generation. After parsing, the compiler device may generate an intermediate code of the source code. It may represent a program for some abstract machine or for a target device. It is typically in between the high-level language and the machine language. The intermediate code may be in SSA form.

The second compiler part 433 may be arranged for code generation. For example, a code generator may take the representation of the intermediate code and map it to the target machine language. The code generator translates the intermediate code into a sequence of machine code. The machine code may be re-locatable.

Any one of the first and second compiler parts may perform additional compiler tasks, e.g., one, none or both of the first and second compiler parts. The additional compiler task may comprise code optimization, and allocation. Code optimization may remove unnecessary code, and arrange the sequence of statements in an order to speed up the program execution. During allocation registers, memory etc. may be allocated to variables.

The compiling device may be in form of a compiler program. The compiler may be configured to protect a program, e.g., its variables and/or its processed data. Advantageously, the compiler may automatically create a program P that is executed in the encoded domain, at least in part. A programmer may code programs in the plain domain and only later, if the programmer is interested in executing such programs in the encrypted domain, then program P may be compiled towards the encrypted domain.

In the compiler, after partial compilation, e.g., by first compiler part 432, a graph representation may be obtained, or an intermediate representation (IR) of the program. In an embodiment, the IR program is represented as a sequence of statements in such a way that the right-hand sides comprise up to two operands. An IR representation of the program can be transformed to have the SSA property.

After compilation and SSA transform, the resulting data flow graph might contain subnetworks of blocks using phi and copy instructions. The borders of such networks are represented by nodes with different types of statements, e.g., arithmetical, memory operations, etc.

In an embodiment, the first step may be to transform the input program into an intermediate representation with the SSA property. This step is not compulsory, but it facilitates next steps. The static single assignment (SSA) property: each variable is assigned exactly once, and every variable is defined before it is used. In this graph, the edges are (temporal) variables and the nodes are operations $(+, -, *, \ldots)$, memory accesses $(*p= \ldots)$ etc. The phi operation is used to implement data selection in the graph. For instance, $z=\text{phi}(a,b)$ means that when the last assignment to a is more recent than the last assignment to b, then a should be assigned to z, or vice versa.

The following step is to perform liveness analysis, e.g., a list is obtained containing the variables still to be used at a later time point in the program execution. Assume that we have a single variable called B. Having this information, variable A1, A2, A3 and related operations can be protected. For instance, consider the following operation:

$$A3 = A1*A2 + A2$$

Such operations and the variables can be protected by means of B (or set of variables B) in different ways.

If we apply obfuscation, then variable B can be used as and XOR mask:

$$A1 = A1 \text{ XOR } B$$

$$A2 = A2 \text{ XOR } B$$

$$\ldots$$

$$A3 = (((A1 \text{ XOR } B) * (A2 \text{ XOR } B)) + (A2 \text{ XOR } B)) \text{ XOR } B$$

This means, that instead of keeping in memory A1, A2, and A3 we keep the XORed values with B. Recall that B is alive and static in the above protection scope. B may be any ordinary variable in the program, which itself serves some function in the program.

If we apply encodings, then operations with variables A1, A2, and A3 can be protected in a similar way. We consider the usage of a Residual Number System (RNS). We assume that there is a function RNS_param(x) that returns the number of moduli N and the moduli $q_0, \ldots q_{[N-1]}$.

$A1\_rns = RNS\_rep(A1, RNS\_param(B))$ $A2\_rns = RNS\_rep(A2, RNS\_param(B))$

...

$A3\_rns = RNS + (RNS * (A1\_rns, A2\_rns), A2\_rns)$

For two functions RNS+ and RNS*. In the above lines, RNS_rep(x,y) returns the RNS representation of x given a number N of moduli $q_0, \ldots, q_{[N-1]}$. RNS*(x,y) performs the multiplication between RNS representations of x and y. RNS+(x,y) performs the addition between the RNS representations of x and y.

Note that the protection can also be realized by using a set of variables B1, B2, . . . , BM (not only B as in above example) to protect variables A1, A2, A3, . . . , Ax. This can be done by using a function COMBINE(B1, B2, . . . , BM) to derive a value used as XOR mask (in the case of obfuscation) or as input to RNS_param( ). In an embodiment, the obfuscation and/or encodings need to be reversed before the livetime of variables in set B come to an end. Note also that it is also possible to use nested scopes with multiple sets of variables. For example, suppose that B is static over A, and C is static over B, D is static over C, etc. Then D may be used to encode C, C may be used to encode B, and B may be used to encode A, etc.

Note the importance of the live-set versus the not-live set. Any approach to 'live' that is too large, will result in not-live that is too small, but this does not affect the correctness of masking. Although estimations are allowed, we do need, however, to establish this not-live property for specific variables at the statement level.

The points in the program where we consider a "live Set of variables" is just before and just after a statement. In order to compute this set, we could take all possible future executions into account. To improve efficiency, so we compute the full final live sets at the start and end of each basic block, e.g., using a known algorithm such as described above. Next a backward traversal of the block, initialized with the live-out set of the block is used to determine live variables across each statement.

For the out masking algorithm we are interested in the question: "Is variable 'a' never changed during the lifetime of variable 'x'". This translates to: for each statement S that changes variable 'a', is variable 'x' guaranteed not-live during the execution of 'S'. (And during the execution of 'S' amounts to 'directly before and directly after S').

We are therefore interested in the not-live set, across specific potential mask changing statements, and accordingly we do not have to do a full liveness analysis. It suffices to show that variable 'x' is guaranteed not-live across specific statements. In the example below it is shown how this can sometimes be deduced without a global analysis. However, the global analysis is so cheap, that there is usually no compelling reason not to use it. Furthermore, with a global liveness analysis, the set of variables guaranteed not to be live is maximal (the inverse of the live set), and this increases the set of possible masks.

Example: Consider the block below:

$x = 10;$ $y = s;$ $z = y + x;$

...

$t = f(z)$

Locally we can conclude that variable z is not-live before or after statement y=s; If 'y=s' is the only statement that changes 'y', we can use 'y' to mask 'z'.

$x = 10;$ $y = s;$ $z = \text{mask}(y + x, y);$

...

$t = f(\text{unmask}(z, y))$ since z is not-live during the assignment to y, uses of z, wherever they are in the program, will not be affected by 'y=s'.

Other approaches, perhaps based on properties of the linear program text, may also work, as long as we can determine that the variable that we want to protect is not-live at the statements that change the protecting variable. Thus any kind of analysis that marks too many variables as live across a statement will lead to a functionally correct result.

In the various embodiments of compiler device 400, the communication interface may be selected from various alternatives. For example, the interface may be a network interface to a local or wide area network, e.g., the Internet, a storage interface to an internal or external data storage, a keyboard, an application interface (API), etc.

The compiler device 400 may have a user interface, which may include well-known elements such as one or more buttons, a keyboard, display, touch screen, etc. The user interface may be arranged for accommodating user interaction for performing a compiling action.

Storage for compiling device 400 may be implemented as an electronic memory, say a flash memory, or magnetic memory, say hard disk or the like. The storage may comprise multiple discrete memories together making up the storage. The storage may also be a temporary memory, say a RAM.

Typically, the device 4000 each comprise a microprocessor which executes appropriate software stored at device 400; for example, that software may have been downloaded and/or stored in a corresponding memory, e.g., a volatile memory such as RAM or a non-volatile memory such as Flash. Alternatively, the device 400 may, in whole or in part, be implemented in programmable logic, e.g., as field-programmable gate array (FPGA). Device 400 may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, compiling device 400 comprises one or more of a first compiler part circuit, a second compiler part circuit, a liveness analyzer circuit, a variable selector circuit, and a code modifier circuit. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 5:
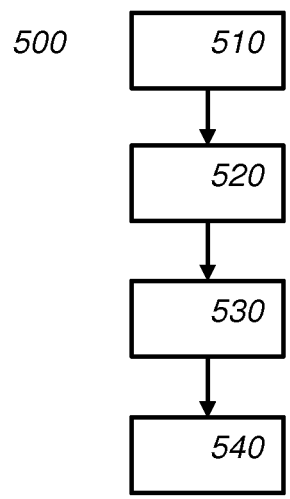

FIG. 5 schematically shows an example of an embodiment of a compiler method 500. Compiler method 500 obfuscates a computer program. The compiler method comprises receiving (510) a computer program representation, performing (520) a live variable analysis on the computer program representation, the live variable analysis obtaining liveness regions (444) associated with a set of variables (442) allocated in the computer program representation, define-information, and use-information, selecting (530) from the set of variables a first variable and a second variable, wherein the second variable is not defined in the liveness region associated with the first variable according to the define-information associated with the second variable, modifying (540) the computer program representation at locations defined by the define-information and by the use-information associated with the first variable with encoding code configured to encode the first variable using at least the second variable as an encoding parameter.

Many different ways of executing the method are possible, as will be apparent to a person skilled in the art. For example, the steps can be performed in the shown order, but the order of the steps may also be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

Embodiments of the method may be executed using software, which comprises instructions for causing a processor system to perform method 500. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

The following numbered clauses include embodiments that are contemplated and nonlimiting: Clause 1. A compiler device (400) arranged for obfuscation of a computer program, the compiler device comprising a communication interface (431) arranged to receive a computer program representation, a processor configured to perform a live variable analysis on the computer program representation, the live variable analysis obtaining liveness regions (444) associated with a set of variables (442) allocated in the computer program representation, define-information, and use-information, selecting from the set of variables a first variable and a second variable, wherein the second variable is not defined in the liveness region associated with the first variable according to the define-information associated with the second variable, modifying the computer program representation at locations defined by the define-information and by the use-information associated with the first variable with encoding code configured to encode the first variable using at least the second variable as an encoding parameter. Clause 2. A compiler method (500) arranged for obfuscation of a computer program, the compiler device comprising receiving (510) a computer program representation, performing (520) a live variable analysis on the computer program representation, the live variable analysis obtaining liveness regions (444) associated with a set of variables (442) allocated in the computer program representation, define-information, and use-information, selecting (530) from the set of variables a first variable and a second variable, wherein the second variable is not defined in the liveness region associated with the first variable according to the define-information associated with the second variable, modifying (540) the computer program representation at locations defined by the define-information and by the use-information associated with the first variable with encoding code configured to encode the first variable using at least the second variable as an encoding parameter.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 6A:
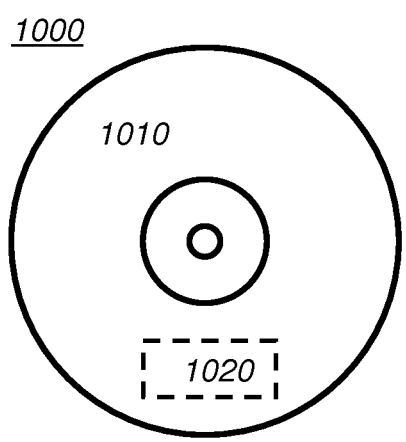

FIG. 6a shows a computer readable medium 1000 having a writable part 1010 comprising a computer program 1020, the computer program 1020 comprising instructions for causing a processor system to perform a compiler method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of compilation.

Figure 6B:
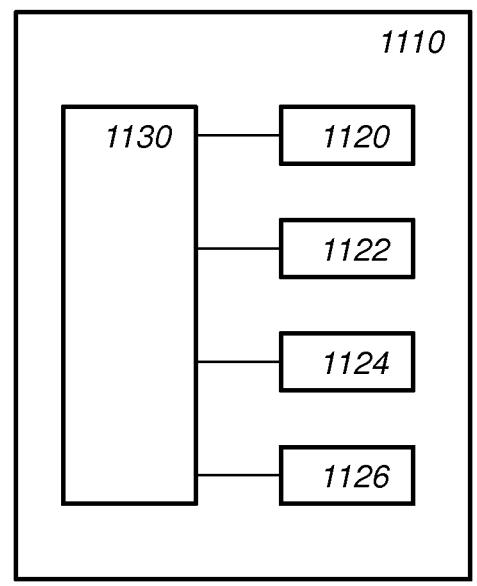

FIG. 6b shows in a schematic representation of a processor system 1140 according to an embodiment of a compiler device. The processor system comprises one or more integrated circuits 1110. The architecture of the one or more integrated circuits 1110 is schematically shown in FIG. 6b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the compiler device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A compiler device arranged for obfuscation of a computer program, the compiler device comprising
    a communication interface circuit, wherein the communication interface circuit is arranged to receive a computer program representation; and
    a processor circuit,
    wherein the processor circuit is arranged to perform a live variable analysis on the computer program representation,
    wherein the live variable analysis obtains liveness regions define-information and use-information,
    wherein the liveness regions are associated with a set of variables allocated in the computer program representation,
    wherein the define-information indicates where a variable is written,
    wherein the use-information indicates where a variable is read,
    wherein the processor circuit is arranged to select from the set of variables a first variable and a second variable,
    wherein the second variable is not defined in the liveness region associated with the first variable according to the define-information associated with the second variable,
    wherein the processor circuit is arranged to modify the computer program representation at locations defined by the define-information and by the use-information associated with the first variable with encoding code,
    wherein the encoding codes is arranged to encode the first variable using at least the second variable as an encoding parameter.

2. The compiler device as in claim 1,
    wherein the computer program representation comprises a control flow graph, the liveness regions,
    wherein define-information and use-information comprise nodes in the control flow graph.

3. The compiler device as in claim 1,
    wherein the processor circuit is arranged to select a first variable at random from the set of variables, or
    wherein the processor circuit is arranged to select first variables one at a time from the set of variables.

4. The compiler device as in claim 1,
wherein the processor circuit is arranged to select a first variable according to a compiler directive in the computer program representation,
wherein the processor circuit is arranged to determine if a second variable exists, and if not, generate a warning signal.

5. The compiler device as in claim 1,
wherein the processor circuit is arranged to determine multiple second variables for a given first variable,
wherein the processor circuit is arranged to randomly select a second variable from the determined second variables, or
wherein the processor circuit is arranged to select a second variable,
wherein the second variable has a use closer to the liveness region of the first variable.

6. The compiler device as in claim 1,
wherein the encoding code is arranged to mask the first variable with the second variable, or
wherein the encoding code is arranged to apply an encoding table to the first variable,
wherein the encoding table uses the second variable as a key.

7. The compiler device as in claim 1,
wherein the encoding code is arranged to encode the first variable in a residue number system,
wherein the moduli of the residue number system are derived at least in part from the second variable.

8. The compiler device as in claim 1, wherein modifying the computer program representation comprises replacing an operation on an encoded first variable with an encoded operation.

9. The compiler device as in claim 8, wherein the encoded operation does not modify the second variable.

10. The compiler device as in claim 1, wherein the processor circuit is arranged to compile the modified computer program.

11. The compiler device as in claim 1, wherein the processor circuit is arranged to perform one or more of parsing, intermediate code generation, code optimization, allocation, target code generation.

12. A compiler method for obfuscation of a computer program comprising
receiving a computer program representation,
performing a live variable analysis on the computer program representation,
wherein the live variable analysis obtaining liveness regions define-information and use-information;
wherein the liveness regions are associated with a set of variables allocated in the computer program representation,
wherein the define-information indicates where a variable is written,
wherein the use-information indicating where a variable is read,
selecting from the set of variables a first variable and a second variable,
wherein the second variable is not defined in the liveness region associated with the first variable according to the define-information associated with the second variable,
modifying the computer program representation at locations defined by the define-information and by the use-information associated with the first variable with encoding code,
wherein the encoding codes is arranged to encode the first variable using at least the second variable as an encoding parameter.

13. A computer program stored on non-transitory medium, wherein the computer program when executed on a processor performs the method as claimed in claim 12.

14. The method as in claim 12,
wherein the computer program representation comprises a control flow graph, the liveness regions,
wherein define-information and use-information comprise nodes in the control flow graph.

15. The method as in claim 12, further comprising selecting a first variable at random from the set of variables.

16. The method as in claim 12, further comprising selecting first variables one at a time from the set of variables.

17. The method as in claim 12, further comprising:
selecting a first variable according to a compiler directive in the computer program representation; and
determining if a second variable exists, and if not, generate a warning signal.

18. The method as in claim 12, further comprising:
determining multiple second variables for a given first variable; and
randomly selecting a second variable from the determined second variables.

19. The method as in claim 12, further comprising:
determining multiple second variables for a given first variable; and
selecting a second variable, wherein the second variable has a use closer to the liveness region of the first variable.

20. The method as in claim 12, further comprising masking the first variable with the second variable.

21. The method as in claim 12, further comprising applying an encoding table to the first variable, wherein the encoding table uses the second variable as a key.

* * * * *